United States Patent [19]
Kilgariff

[11] 4,076,209
[45] Feb. 28, 1978

[54] IMPROVED TAP
[75] Inventor: Thomas A. Kilgariff, Glenunga, Australia
[73] Assignee: Kilgariff Holdings Pty. Ltd., Australia
[21] Appl. No.: 670,565
[22] Filed: Mar. 25, 1976
[51] Int. Cl.² ............................................. F16K 31/524
[52] U.S. Cl. ....................................... 251/251; 251/257
[58] Field of Search ............... 251/237, 239, 244, 251, 251/257, 258, 259, 222, 225, 263

[56] References Cited
U.S. PATENT DOCUMENTS
3,207,467  9/1965  Bühler .................................. 251/259
3,342,448  9/1967  Parkison .............................. 251/257
3,481,360  12/1969  Gillberg .............................. 251/318

FOREIGN PATENT DOCUMENTS
446,902  3/1974  Australia ............................. 251/257

Primary Examiner—Martin P. Schwadron
Assistant Examiner—G. L. Walton
Attorney, Agent, or Firm—Haseltine, Lake & Waters

[57] ABSTRACT

A lever operated tap or cock, the lever actuating a cam to cause a piston to move to open a valve against the action of a spring and the water pressure. The valve is thus manually opened, but the closing of the valve is by spring and water pressure only.

9 Claims, 3 Drawing Figures

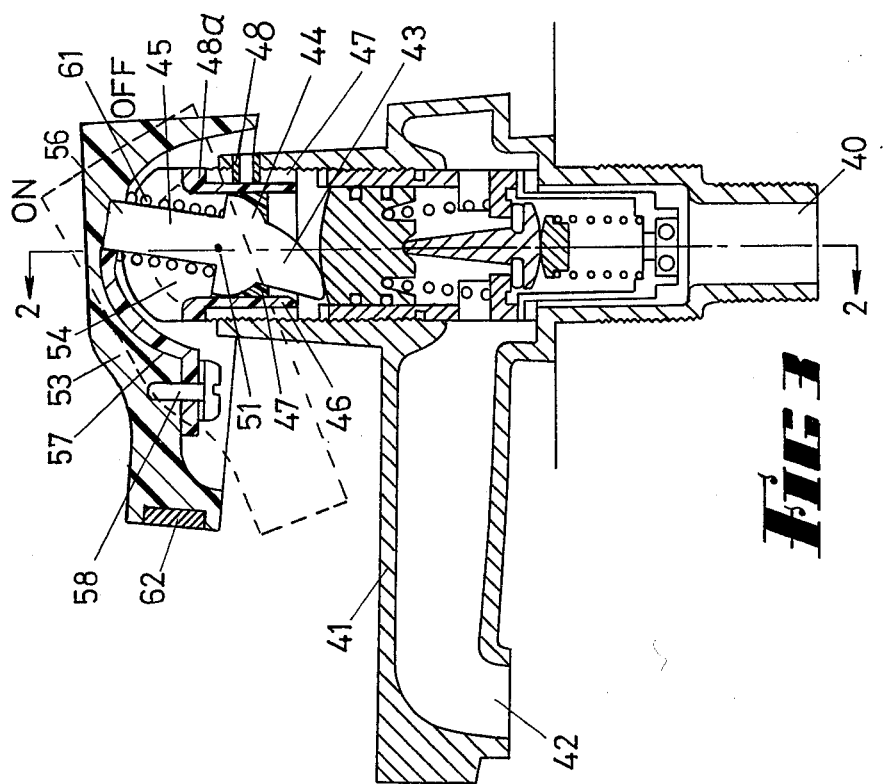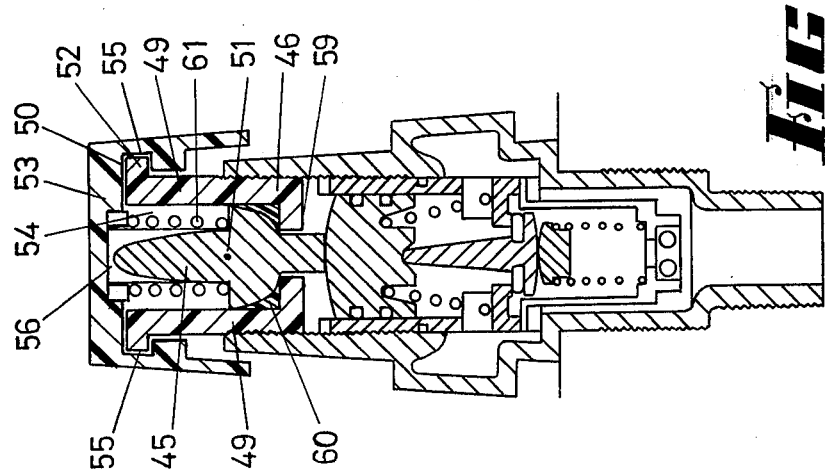

IMPROVED TAP

FIELD OF THE INVENTION

This invention relates to taps or pillar cocks.

BACKGROUND OF THE INVENTION

Cocks or taps as used in hospitals, domestic homes for use over sinks, tubs and basins are usually operated by a screw or lever action where the valve sealing member is applied by manual pressure onto the valve seat.

While this effectively closes and prevents the flow of water, there is often a tendency to apply too much force and this excessive pressure damages the sealing washer so that in order to prevent leakage further pressure is often applied.

Also in hospitals and like institutions, lever operation is often essential, where the tap is operated by an elbow, arm or knee and also due to the length of the lever excessive pressure can be applied during the closing operation.

Additionally in some installations, such as in public conveniences, hotels, motels and the like, the cocks should be such that they are less prone to vandalism where often portions of the tap or cock such as knobs, handles and the like are often removed.

DESCRIPTION OF THE PRIOR ART AND SUMMARY OF THE INVENTION

Various taps and cocks are known and one form has previously been described in Australian Pat. No. 446,902 which is a lever operated tap, and this tap is satisfacory in many respects and it is an object of this invention to further improve that valve to reduce the number of component parts so that the valve can be produced in a more economical manner, and also provided with a lock whereby the operating member is securely held in a manner which deters removal by vandals.

BRIEF DESCRIPTION OF THE DRAWINGS

In order to more fully describe the invention reference is made to the enclosed drawings in which:

FIG. 2 is a cross sectional view of a second embodiment of the invention, and

FIG. 3 is a section taken along the lines 3—3 of FIG. 2.

DESCRIPTION OF THE PREFERRED EMBODIMENT

Figure 1:
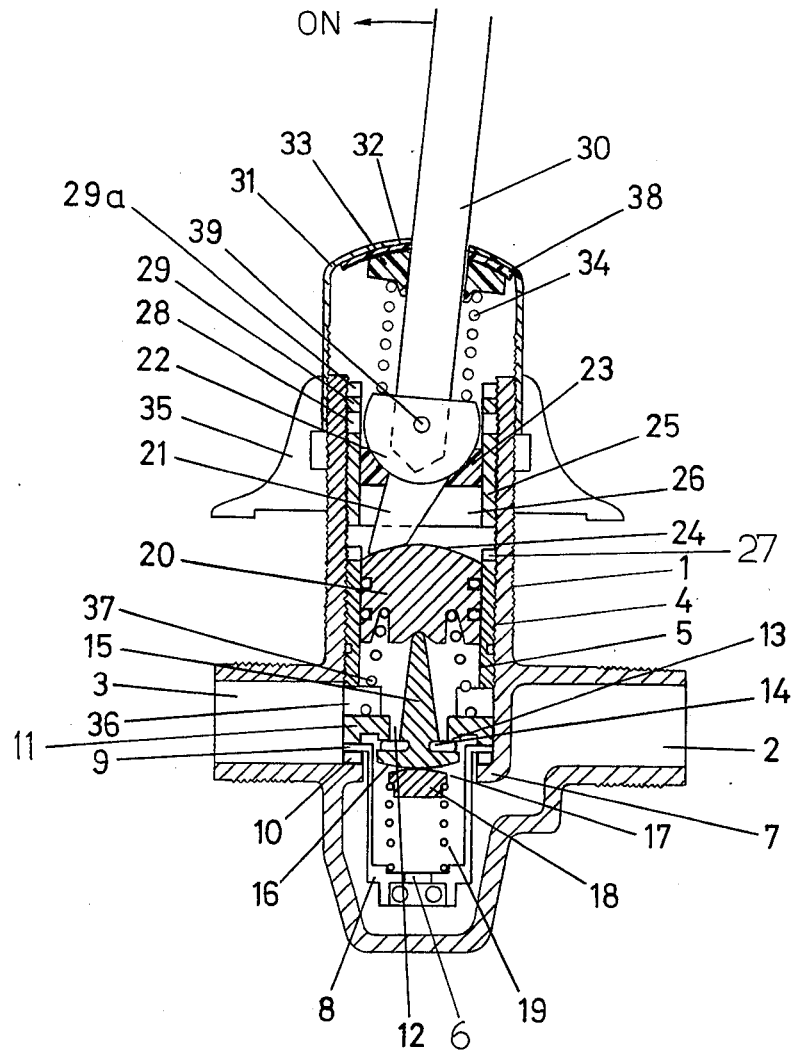
FIG. 1 is a cross sectional view of one form of the invention.

The tap has a body 1 having an inlet fitting 2 and an outlet fitting 3. The body 1 is hollow and internally threaded at 4 so that a cylinder 5 can be screwed therein. The wall of the body 1 extends downwardly into the passage 6 between the inlet 2 and the outlet 3, on the inlet side so that the water flows through the passage 6 under the wall extension.

A lip 7 is formed at the bottom of the tubular body 1 and this supports a housing 8 which has a peripheral flange 9 to engage the lip 7 with a fibre sealing washer 10, the housing 8 being clamped in this position by the cylinder 5 being screwed into the body 1 to engage the lip 9.

The cylinder 5 is provided with a bottom 11 having an aperture 12 therein, the bottom 11 on its lower surface around the aperture forming a valve seat 13 against which a sealing washer 14 is adapted to engage. This washer is applied by a washer stem 15 having a curved lower surface 16 which is engaged by a curved upper surface 17 of a button 18 which is pressed upwardly by a spring 19 engaging the bottom of the housing 8.

Thus the spring 19 thus applies the closing pressure to the sealing washer, and as the button 18 has its curved surface 17 engaging the curved surface 16 of the washer stem 15, there is equal pressure around the sealing washer so that there are no unequal pressures to cause faulty sealing of the washer. The sealing force of the spring 19 is reinforced by the pressure of the water in the inlet.

The valve is opened by a downward force on the washer stem 15 by a piston 20 fitted with a pair of "0" rings and which is slidable in the cylinder 5, and is pushed downwardly by a cam toggle 21 on a spherical cam 22 which is pivotable in a spherically shaped washer 23. The cam toggle 21 extends at an angle to the piston 20 which is curved at its top at 24, the toggle 21 being similarly curved so that on rotation in the spherically shaped washer 23, the toggle 21 has its lower face formed in a manner to have an acute shape to engage the piston off center so that as the piston is depressed it has a small turning effect on the piston to limit and evenly distribute the wear on surface 24.

The cam 22 is mounted in a sleeve 25 being closed at its bottom end but having a slot 26 therein through which the cam toggle 21 protrudes. The washer 23 of a suitable plastics material fits into the bottom of the sleeve to carry the cam 22. The sleeve 25 screws down above the top of the cylinder 5, the top of the cylinder 5 having screwing slots 27, and also the sleeve has at upper end screwing slots 28 and a locking ring 29 also fitted with screwing slots 29 (a).

The cam 22 has a handle 30 extending upwardly therefrom through a casing 31 which screws by means of a fine thread over the body 1, the casing having a circular hole 32 through which the handle extends. About the handle under the slot there is a colored indicator 33 of suitable plastics material, which covers the slot and which engages a suitable plastics washer 38 and which can be used to distinguish the type of water that is either hot or cold by a suitable color code, and is maintained upwardly against the casing by a spring 34. The handle 30 is fitted to the cam 22 and retained therein by a pin 39.

For mounting the tap on a wall, a wall flange 35 can be screwed on an external thread on the body 1 and is of stepped construction to allow the casing 31 to be screwed into the flange 35 over the body 1.

Thus by operation of the handle 30, the toggle 21 wipes over the piston 20 to depress this piston, the piston acting directly on the washer stem 15 to open the valve. The water flows from the inlet 6 up through the housing 8 through apertures which acts as a flow control, and the valve seat and into the interior of the cylinder 5 to exit through passages or slots 36 in the cylinder to pass through the outlet 3.

The spring 34 acting between the cam 22 and the indicator 33 applies sufficient pressure on the cam 22 so that the desired frictional force between the cam 22 and the washer 23 maintains the handle in whichever position it is placed.

On release of the handle, it can be moved back to its off position and by the provision of the spring 37 acting between the bottom of the cylinder 5 and the under side of the piston 20, the piston returns to its uppermost position, the spring being a tapered compression spring and being received in a recess in the under surface of the piston. As the piston 20 moves upwardly, the spring 19 acting through the button 18 causes the valve to close on the seat 13, the curved surfaces 16 and 17 allowing the valve seat to correctly orientate and have equal pressure applied therearound.

Provision for wear can be effected by adjusting sleeve 25 through 180° and locking in position by the locking ring 29. Also adjustment can be made by screwing the casing 31, and alternatively, shims can be fitted under the spherically shaped washer 23. Any wear which occurs on the top surface 24 of the piston 20 is automatically accommodated by the sloping bottom of toggle 21.

FIGS. 2 and 3 show a further embodiment where a pillar cock is utilized as a household fitting over a wash basin or sink, and while a pillar cock is shown the invention can also be applied to bib-cocks, recessed cocks and stop cocks, etc.

The pillar cock has an axial inlet 40 and a generally horizontally extending outlet 41 ending in a circular outlet opening 42. The cock is generally similar to the above example except that the operating handle and details are modified, the piston and sleeve and other details of the axial valve itself being as shown in the above example.

The piston 20 is actuated by a cam toggle 43 integrally attached to a cam 44 having a stem 45. The cam 44 is mounted in a sleeve 46 which is screwed into the body 1, the external surface of the sleeve having spaced longitudinal slots 47 so that the sleeve can be locked in position by a locking grub screw 48 which can engage the desired one of the two diametrically opposite slots 47.

The sleeve 46 is formed at its upper end with a square flange 48a which has a pair of upstanding side walls 49, these having a curved upper edge 50 which has as its centre of curvature the point 51. Each upper edge 50 has a lug 52 similarly curved and extending out from the plane of the side wall 49, each lug thus in effect being a curved extending flange.

The handle 53 has a hollowed out portion 54 and a pair of arcuate grooves 55, so that by feeding the lugs into the grooves the handle can be positioned to move in an arcuate manner about the point 51. A recess 56 is provided in the handle to receive the end of the stem 45, and to allow the handle and stem and sleeve to be assembled, this recess extends to the edge of the hollowed out portion, and after assembly a locking piece 57 is fitted and retained by a screw 58.

The bottom of the sleeve 46 is formed with a slot 59 through which the cam toggle 43 extends in a tightly fitting manner, and in the bottom is inserted a bearing ring 60 of a suitable plastics material. A spring 61 acts between the cam about the stem 45 to act on the top of the handle to hold the components resiliently assembled.

After assembly of the handle portion, the sleeve is secured in the body 1 by screwing in and then locking therein by the locking screw 48. When so assembled the screw is accessible only when the handle is tilted to the on position, and thus if the tap is used in public areas, this is a deterrent to vandalism in that the tap must be turned on to allow the screw to be accessible.

On the front of the handle an insert 62 can be inserted of the desired color so that an indication can be given of the type of water to be controlled by the tap.

Thus there is provided a tap or pillar cock which can be used for domestic appliances in which a simple tilting movement can be used for the control of the water through the tap and that the closing action is achieved by a spring in conjunction with the water pressure so that excessive forces and the like can be applied to the sealing members and hence the life of the sealing washers is greatly increased.

Also as the tap is not readily accessible except when in the on position the tap is a deterrent against vandalism and the like.

What is claimed is:

1. A fluid control valve comprising a cylindrical hollow body having an inlet, and an outlet, a cylinder screwed directly into the hollow body and having a bottom defining an aperture surrounded by a valve seat, a valve member closing the aperture by engagement on the seat, said valve member having a stem extending through the aperture, a piston slidable in said cylinder and engaging the stem, spring means acting between the cylinder bottom and the piston, further spring means acting to close the valve member, and cam means for actuating the piston to open the valve, whereby the closure of the valve is by said spring means assisted by fluid pressure and manual effort is applied only to open the valve, said inlet and outlet in the cylindrical body being disposed laterally, said cylindrical body including an upstanding portion extending upwardly beyond said inlet and outlet, said cylinder extending within said upstanding portion to the level of said inlet and outlet, said piston being confined within said cylinder, said cam means penetrating into said cylinder into engagement with said piston and a sleeve mounted on said hollow body above said cylinder for axial adjustable movement relative thereto, said cam being supported by said sleeve.

2. A fluid control valve as defined in claim 1 wherein the cam means comprises a cam toggle mounted on said spherical cam to which a handle is attached, a sleeve being screwed into said hollow body, said cam toggle being mounted in said sleeve, the valve having a casing closing the body and through which the handle protrudes.

3. A fluid control valve as defined in claim 1 wherein the further spring means to close the valve comprises a spring acting between a button engaging the valve member and a housing having a flange engaging a lip on the body, the cylinder engaging the flange and a sealing washer to seal and locate the housing in position on the lip.

4. A fluid control valve as defined in claim 1 wherein the cam comprises a cam toggle engaging the piston, the cam having a stem engaging a handle, a sleeve having a bearing to receive the cam, the sleeve being screwed into the body and including a pair of arcuately shaped lugs engaged in a pair of arcuate grooves in the handle, whereby tilting of the handle moves the cam toggle over the piston.

5. A fluid control valve as defined in claim 4 wherein the handle has a locking piece to retain the stem in position, the sleeve being retained by a locking screw protruding through the body into the sleeve, which screw is exposed only when the handle is tilted to the on position.

6. A fluid control valve as defined in claim 1 wherein the friction created between the cam and seat by pressure from the spring between the cam and indicator button, determined by the screwing of the casing on to the body of the valve allows the fluid to flow at any rate, and be held in that position by the position of the handle held in place by the aforesaid friction between the cam and its seating.

7. A fluid control valve as defined in claim 1 wherein said piston has a bottom surface confined within said cylinder engaged by said spring means and by said stem.

8. A fluid control valve as defined in claim 7 wherein said bottom surface of the piston lies substantially in a horizontal plane.

9. A fluid control valve as defined in claim 8 wherein said bottom surface of the piston has a central recess receiving said stem of the valve member, and a groove receiving said spring means.

* * * * *